July 27, 1965 A. B. NEILD, JR 3,197,342

ARRANGEMENT OF THERMOELECTRIC ELEMENTS FOR IMPROVED GENERATOR EFFICIENCY

Filed Sept. 26, 1961 2 Sheets-Sheet 1

INVENTOR

ALTON B. NEILD, JR.

BY Marvin Reich

ATTORNEY

July 27, 1965 A. B. NEILD, JR 3,197,342
ARRANGEMENT OF THERMOELECTRIC ELEMENTS FOR
IMPROVED GENERATOR EFFICIENCY
Filed Sept. 26, 1961 2 Sheets-Sheet 2

INVENTOR
ALTON B. NEILD, JR.

BY Marvin Reich

ATTORNEY

United States Patent Office 3,197,342
Patented July 27, 1965

3,197,342

ARRANGEMENT OF THERMOELECTRIC ELEMENTS FOR IMPROVED GENERATOR EFFICIENCY

Alton Bayne Neild, Jr., Glen Burnie, Md., assignor to the United States of America as represented by the Secretary of the Navy Filed Sept. 26, 1961, Ser. No. 141,916
3 Claims. (Cl. 136—4)
(Granted under Title 35, U.S. Code (1952), sec. 266)

The invention described herein may be manufactured and used by or for the Government of the United States of America for governmental purposes without the payment of any royalties thereon or therefor.

This invention broadly relates to thermoelectric generators of a type which utilizes thermopiles to convert heat directly into electricity; and more particularly relates to the construction of a thermoelectric means about an exhaust duct for very hot combustion gases for converting into electricity heat contained in the hot gases.

An object of the present invention is to provide an efficient thermoelectric means for converting heat energy of hot exhaust gases directly into electricity.

Another object is to provide a reliable thermoelectric generator which will continue to operate after part of generator has been destroyed.

A further object of the invention is to provide a thermoelectric generator utilizing a length of a duct, pipe, tube, or the like having a high temperature gradient along its length.

A further object of the invention is to provide a thermoelectric generator which may have part of the generator disconnected when the power requirements decline.

In accordance with the preferred form of the invention a plurality of thermoelectric generator banks or rows are connected in parallel, each containing a group of series-connected thermoelectric elements which are placed between a heat source and a heat sink. Preferably the banks are spaced circumferentially about an outlet duct for combustion gases, the banks extending longitudinally of the duct. As the hot gases pass through the duct electricity is produced by the banks. In addition, the thermoelectric elements of the banks are segmented in different ways so that efficient heat-to-electricity conversion materials may be utilized in accordance with their positions along the length of the duct which may be very hot at the inlet end and comparatively very cool at the other end.

Other objects and many of the attendant advantages of this invention will be readily appreciated as the same become better understood by reference to the following detailed description when considered in connection with the accompanying drawings wherein.

Figures 1, 4:
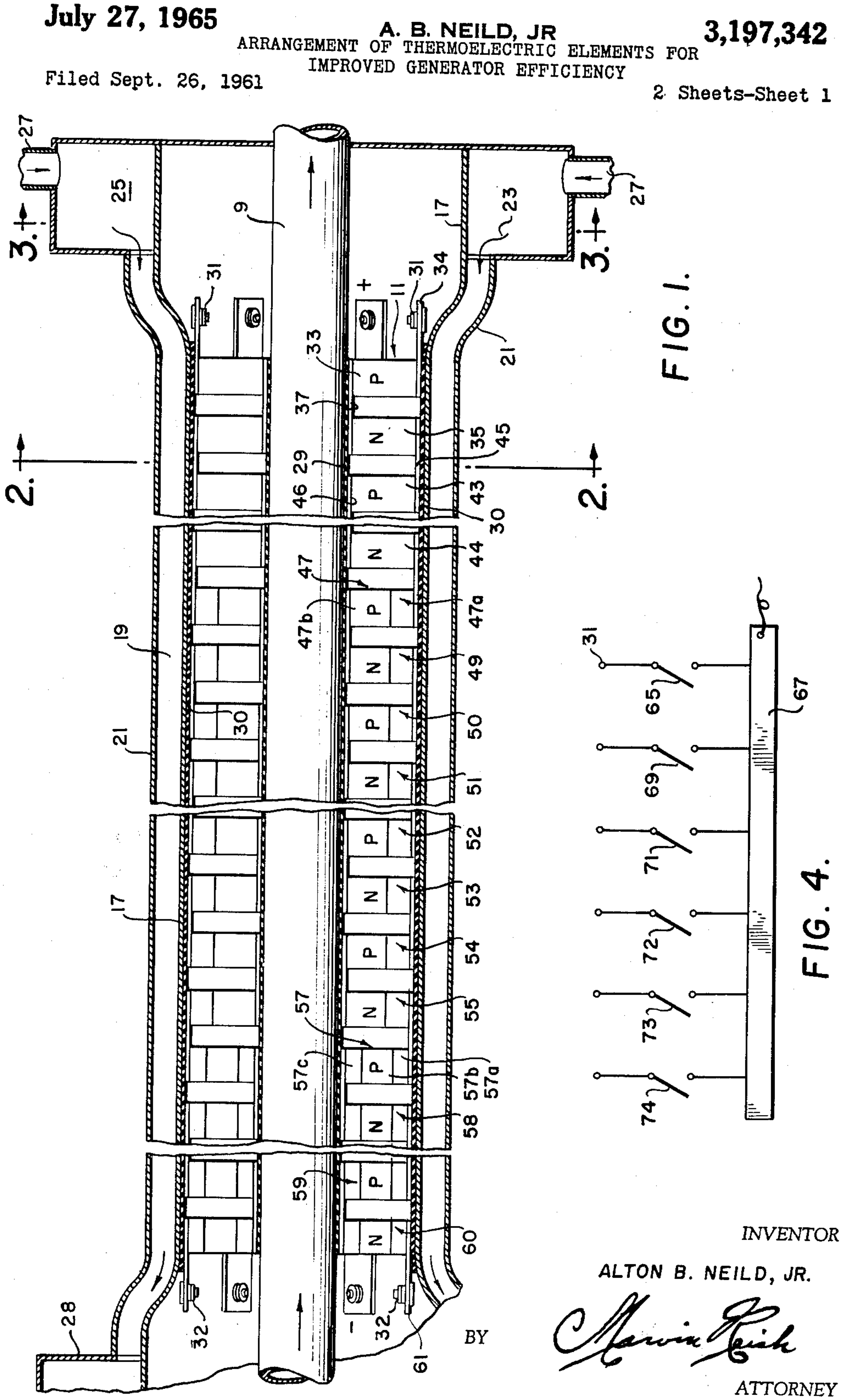
FIG. 1 is a longitudinal sectional view of a preferred form of the invention, the breaks being indicative of length.
FIG. 4 is a switching circuit in accordance with the invention.
Figure 3:
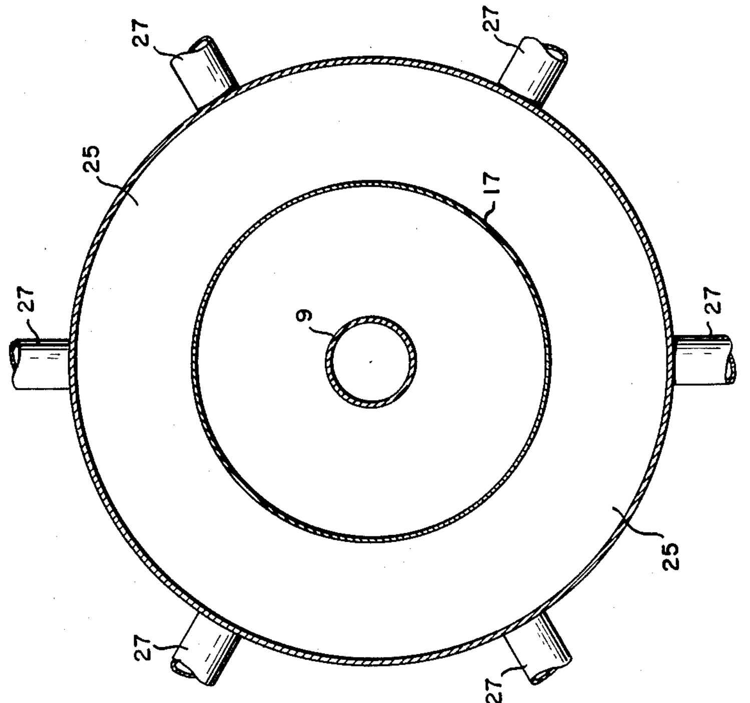
FIG. 3 is a sectional view taken along lines 3—3 of FIG. 1 looking in the direction of the arrows.

Referring to FIG. 1, an exhaust duct in the form of a conduit tube 9 is provided to carry away hot exhaust gases, such as for example from an internal combustion engine or from the boilers of a ship, and then discharge the gases to atmosphere. Hot gases flow through the tube 9 from the hot end to a relatively cooler end as indicated by the arrows within the tube. Such gases may have temperatures of up to about 2500° F. and more at the hot end and about 300° F. at the cool end.

Exhaust tube 9 forms an inner tube around which a plurality of parallel banks of thermoelectric generator are placed in circumferentially spaced relation. In the embodiment described six such banks 11, 12, 13, 14, 15, and 16 are shown. The individual banks will be referred to hereinafter in greater detail.

A pipe 17 encloses the thermoelectric generator banks, forming the inner wall of a heat sink 19 in the form of an annular tubular conduit having an outer pipe 21 forming the outer wall of the heat sink. In operation, cold water continuously flows through the heat sink, as indicated by arrow 23, in a direction counter to that of the gases in tube 9; the water coming from a manifold or reservoir 25. In the case of a ship the reservoir 25 may be supplied with relatively cool water through one or more pipes 27 which may be connected to a pump means, not illustrated, and thence to the sea. If the invention is utilized on a land vehicle the pump means may be connected to a heat exchanger, such as for example, a radiator, in a circulating cooling system for the water. The cooling liquid flows from the heat sink 19 into a discharge reservoir 28 which empties into the sea or the heat exchanger, as the case might be. The banks 11–16 are insulated from tube 9 and sink 19 by a thin inner insulating means 29 and an outer insulating means 30. The insulating means may be of any insulating material, such as for example, sprayed on glass, asbestos tape, etc. However, on the hotter portion, heat-resistant insulation should be used, such as for example, sprayed glass, mica, etc.

With the flow of fluids in opposite directions in the tube 9 and heat sink 19, as shown in FIG. 1, the tube and heat sink will be hottest at their left ends and coolest at their right ends. Obviously, the fluid-flows may also be in the same direction. Regardless of the directions of fluid-flow, a radial temperature gradient will exist between the tube and heat sink, and this gradient will be within a certain temperature range depending on the axial point along the axis or length of the tube 9 that the gradient is observed. In accordance with the invention the thermoelectric elements at the various lengthwise points are made of materials that are highly efficient at the temperatures encountered.

Each of the thermoelectric generator banks 11, 12, 13, 14, 15, and 16 extends lengthwise of the tube 9 and heat sink 19, the banks being co-extensive. Each bank itself comprises a separate generator and has a terminal 31 at one end and a terminal 32 at its other end which may be connected to switches on other circuits in any suitable manner. Each of the banks comprises a plurality of radially extending, lengthwise spaced thermoelectric elements, each element having one end adjacent insulation 29 and the other end adjacent insulation 30, so that a temperature gradient exists between these ends which can be utilized to produce thermoelectric energy. At the same lengthwise points and elsewhere, each of the elements of the banks are similarly constructed so that a description of one bank should suffice for all.

As is clear from FIG. 1, the construction of the radially-extending thermoelectric elements vary, depending on their location lengthwise of tube 9. Thus, in order from the right end, the first group of elements comprise a plurality of element each of which is a relatively long segment which occupies most of the radial space between the tube 9 and sink 19. Progressively further to the left, the successive groups comprise elements having several smaller segments radially arranged.

At its cold end, the first element of the bank 11 comprises a radially extending thermoelectric element 33 which is a P type bismuth telluride material most effective for thermoelectric use at temperatures up to 400° F. The terminal 31 is mounted on an outer lengthwise-extending electrode 34 which makes a contact with the radially outward end of the element 33. The second thermoelectric element 35 comprises a single N type material or segment of bismuth telluride; and an inner lengthwise-extending electrode 37 connects the inner ends of elements 33 and 35, forming a hot thermoelectric junction. The next adjacent thermoelectric element 43 of the first group comprise a single segment, made out of P type bismuth telluride. An outer electrode 45 connects the outer ends of segments 43 and 35 together, forming a cold thermoelectric junction; and an inner electrode 46 connects the element 43 to the next adjacent element of the first group. A final element 44 of a single segment is shown for the first group; it being understood that as many such single segment elements of alternating P and N types are provided in this first group as an installation may demand in the lower temperature range.

As the hotter regions are approached, the radial thermoelectric elements comprise two parts or segments. The elements are of alternating P or N types; but the segments of an element are of the same type. Thus, the second group of bank N comprises an element 47 next to the last element 44 of the first group. The element 47 comprises a bismuth telluride segment 47*a* at the cooler end, and an inner lead telluride segment 47*b* at the hotter end of element 47.

It is noted that the thermoelectric elements 49 through 55 representative of any number of such elements in the second group, are constructed in the same manner, but of alternately P and N types, and each element comprises two segments. All pairs of the thermoelectric elements have their ends interconnected by inner and outer electrodes which connect them electrically in a series circuit, and provide hot and cold junctions, respectively.

At the hottest part of tube 9, the third group of elements, represented by thermoelectric elements 57, 58, 59, and 60, comprise elements each of which is constructed in three segments or parts. Taking element 57 as an example, this element is P type and comprises an outer part 57*a*, which is P-type bismuth telluride, an intermediate part 57*b*, which is P-type lead telluride, and an inner part 57*c*, which is P-type nickel oxide. For an N type material zinc oxide can be used instead of nickel oxide. By using different segmented elements the energy at the hot end of the exhaust pipe may be fully utilized. Moreover, each element is effectively segmented with materials most desirable for the temperature therealong.

The last thermoelectric element 60 is connected to an electrode 61 which carries the terminal 32 for making external electrical connections to the generator. It is to be noted that examples of thermoelectric materials have been given but others may be used. Also the number of groups, the number of elements in each group, and the number of segments in each element may be widely varied, depending on temperatures encountered.

Table I shows samples of some of the thermoelectric segments and the heat range at which they may be employed.

*Table I*

| Element | Chemical Formula | Temperature Range |
|---|---|---|
| Bismuth Telluride | $Bi_2Te_3$ | Up to 400° F. |
| Lead Telluride | $PbTe$ | Between 300°–1,150°. |
| Germanium Bismuth Telluride | $Ge_3Bi_2Te_3$ | Do. |
| Germanium Telluride | $GeTe$ | Between 600°–1,150°. |
| Zinc Antimony | $Zn_3Sb_2$ | Between 300°–800°. |
| Lithium Oxide | $Li_2O$ | Between 1,150°–2,500°. |

It is noted that transition metal oxides and silicides can be used in the 1150–2500° F. range. Examples of such materials are nickel oxide, cobalt oxide, strontium oxide, iron oxide, chromium silicide, and iridium oxide.

Table II shows a sample of doping agents which may be utilized with thermoelectric generating crystals or materials for doping the materials for N and P types respectively.

Bismuth, Uranium, and

*Table II*

| Material | For N Type | For P Type |
|---|---|---|
| Bismuth Telluride | Copper, Copper bromine | Bismuth. |
| Zinc Antimonide | | Silver, Tin Tellurium, or Lead (not normally used for N Type). |
| Germanium Telluride | | Cadium, Bismuth (not normally used for N Type). |
| Lead Telluride | Iodine, Chlorine, Manganese, Bromine. | Sodium, Potassium, Thallium. |
| Zinc Oxide | Aluminum Oxide, Titanium Oxide. | |
| Nickel Oxide | | Lithium Oxide. |

Figure 2:
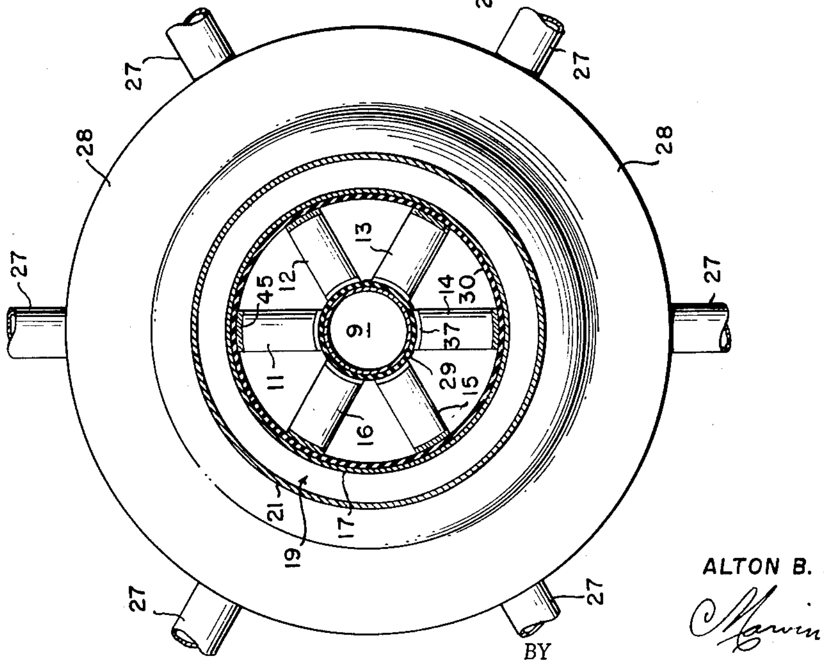
FIG. 2 is a sectional view taken along lines 2—2 of FIG. 1 looking in the direction of the arrows.

It is to be noted that the thermoelectric generator bank 11 has been explained in detail; however, thermoelectric generator banks 12, 13, 14, 15, and 16 are identical in construction to the thermoelectric generating bank 11. The orientation of the thermoelectric banks may be readily seen in FIG. 2.

A suitable switching means for connecting the thermoelectric generator banks 11 through 16 to a load is shown in FIG. 4. A switch 65 is connected to terminal 31 of bank 11 for connecting this bank 11 to a bus bar 67 to which a non-illustrated utilizing load device is coupled. A second switch 69 is provided to make contact between the bus bar 67 and the end terminal of bank 12. Similarly switches 71, 72, 73 and 74 connect thermoelectric generator banks 13 through 16 to the bus bar. It is understood that any number of thermoelectric generator banks may be independently connected to the bus bar 67 so that any two or more of the banks are connected in parallel. Furthermore, switching means for series-parallel connections may be provided, if desired.

A second switching means of the type shown in FIG. 4 is connected to the other side of thermoelectric generating banks in a manner similar to FIG. 4. When a switch 65, 69, 71, 72, 73 or 74 is closed, a corresponding switch is also closed at the other switching means, so that a complete electrical circuit is established for the associated bank.

The operation of the device illustrated in FIG. 1 is such that when hot gases pass through tube 9, the gases establish a lengthwise heat gradient along tube 9 with the intake being the hot end. One end of each of the thermoelectric elements become hot while the other end is cooled by the heat sink 19. Because of this radial heat gradient thermoelectric element 60 which is N type develops a negative potential on its outer relatively cold end and a positive potential on its inner hot end. Thermoelectric element 59 which is P type develops a positive potential on the cold end and a negative potential on the hot end. All the other thermoelectric elements are arranged to produce additive electric voltages in a similar fashion.

All the thermoelectric elements of a bank are connected in series so that all the individual potentials are additive. At the hot end, each thermoelectric element comprises three primary segments in the embodiment described.

As heat transfer (conductive, convection, radiation) reduces the temperature down the length of the tube or duct 9, thermoelectric elements with a lesser number of segments are used at the cooler portions. Finally, at the exhaust end, each thermoelectric element may be primarily a single material. Preferably this material is the material for the cold segment of the next two-segment element; and the materials for the two-segment element are the materials for use in the cooler regions of the three-segment elements. Thus, the materials that are most efficient for conversion of heat to electricity at the low temperatures and at the high temperatures may be used to their full capacities.

The switching means shown in FIG. 4 enables one, two, or any desired number of the banks of thermoelectric generators to be connected in parallel. If one of the thermoelectric generating banks becomes inoperative, its respective switches are opened and the remaining thermoelectric generating banks can be independently utilized so as to give a high degree of reliability. The thermoelectric generator banks may be connected or disconnected as desired to accommodate the need for an increased power supply.

By the arrangement of the banks and their thermoelectric elements as shown, the elements in each bank may be connected in series electrically, and the banks themselves can be connected in parallel. This can be done without fear of internal circuits, since the banks are exactly alike, are exposed to the same temperature gradients, and thus produce the same voltage. The number of elements placed in series determines the magnitude of this voltage.

Thus, there has been described a thermoelectric generator which is capable of utilizing combustion gasses. Further in accordance with the invention as herein disclosed the temperature differential between a heat source and a cooling medium at various points therealong is utilized to a maximized extent by providing thermoelectric elements at the higher temperature points which can operate better at such higher temperatures, and thermoelectric elements at the lower temperature points which can operate better at lower temperatures. In addition, means are provided to increase the reliability of the device disclosed and to enable one to control the amount of the electrical power produced.

Obviously, many modifications and variations of the present invention are possible in the light of the above teachings. It is, therefore, to be understood that within the scope of the appended claims the invention may be practiced otherwise than as specifically described.

What is claimed is:

1. A thermoelectric generator of the type described, comprising a plurality of spaced thermoelectric generating banks, a central tube, said banks being oriented around said tube, each of said banks comprising a first group of thermoelectric elements each of which containing more than two segments, a second group of thermoelectric elements containing two segments and a third group of thermoelectric elements consisting of a single segment, said groups being connected in a series arrangement, having a first end, terminal means, said terminal means being connected to said first end a switching means for selectively connecting said thermoelectric banks in parallel, said switching means containing a plurality of terminal means for connection to said terminal means of said thermoelectric banks said plurality of spaced thermoelectric banks terminal means being connected to said switching means terminal means whereby the amount of power being produced is capable of being controlled and a hollow tubular means spaced about said first central tube and enclosing said thermoelectric banks.

2. A thermoelectric generator as defined in claim 1 but further characterized by having a reservoir connected to said hollow tubular means for insuring an even flow of liquid through said hollow tubular means.

3. A thermoelectric generator as defined in claim 2 wherein each of said banks comprise thermoelectric elements of P-type and N-type materials.

References Cited by the Examiner

UNITED STATES PATENTS

| | | | |
|---|---|---|---|
| 313,215 | 3/85 | Lautensack | 136—4.11 |
| 398,272 | 2/89 | Mestern | 136—4.11 |
| 2,543,331 | 2/51 | Okolicsanyi | 136—5.5 |
| 3,056,848 | 10/62 | Meyers | 136—4 |

FOREIGN PATENTS

| | | |
|---|---|---|
| 463,726 | 8/28 | Germany. |

OTHER REFERENCES

Rosi, Dismukes, Hoching: Materials for Thermoelectricity up to 700° C., Electrical Engineering, June 1960, pages 450–452.

WINSTON A. DOUGLAS, *Primary Examiner.*

JOHN H. MACK, *Examiner.*